US012614163B2

(12) United States Patent
Every

(10) Patent No.: US 12,614,163 B2
(45) Date of Patent: Apr. 28, 2026

(54) PNEUMATIC PAYMENT SYSTEM FOR GAS STATIONS AND METHOD OF USE

(71) Applicant: Deshanna Every, Houma, LA (US)

(72) Inventor: Deshanna Every, Houma, LA (US)

( * ) Notice: Subject to any disclaimer, the term of this patent is extended or adjusted under 35 U.S.C. 154(b) by 317 days.

(21) Appl. No.: 18/453,437

(22) Filed: Aug. 22, 2023

(65) Prior Publication Data

US 2024/0095703 A1      Mar. 21, 2024

Related U.S. Application Data

(60) Provisional application No. 63/404,708, filed on Sep. 8, 2022.

(51) Int. Cl.
*G06Q 20/20* (2012.01)
*B65G 51/40* (2006.01)
(52) U.S. Cl.
CPC ............. *G06Q 20/20* (2013.01); *B65G 51/40* (2013.01)
(58) Field of Classification Search
CPC ........ G06Q 20/20; G06Q 20/18; B65G 51/40; G07F 13/025
USPC .......................................................... 705/16
See application file for complete search history.

(56) References Cited

U.S. PATENT DOCUMENTS

| | | |
|---|---|---|
| 8,915,192 B2 | 12/2014 | Zhou |
| 9,292,823 B2 | 3/2016 | Hoganson |
| 9,611,106 B2 | 4/2017 | Tell |
| 10,023,402 B2 | 7/2018 | Hoganson |
| 10,308,133 B2 | 6/2019 | Kley |
| 2016/0096691 A1* | 4/2016 | Gross ..................... B65G 51/44 406/10 |
| 2016/0125683 A1* | 5/2016 | Jones .................. G07F 17/0071 186/55 |
| 2019/0300301 A1 | 10/2019 | Bambrogan |

OTHER PUBLICATIONS

Unknown. IEEE Recommended Practice for Application of Controllers and Automation to Industrial and Commercial Power Systems. IEEE P3001.11/D8, Oct. 2015. (Year: 2015).*

* cited by examiner

*Primary Examiner* — Fawaad Haider
(74) *Attorney, Agent, or Firm* — Brennan, Manna & Diamond, LLC

(57) ABSTRACT

The present invention relates to a pneumatic payment system for facilitating payments between customers and gas station in a secure and convenient manner. The system includes a plurality of pneumatic tubes extending from gas pumps to a service or payment center. A cylindrical capsule container configured to contain payments, change, and/or receipts transports from a gas pump to payment center for allowing a gas station employee to deduct money and perform transaction. Then, the container is transported back to the gas pump for a customer to receive change, receipt, and/or convenience items. The system uses a central controller for controlling the system and blowers for creating vacuum inside pneumatic tubes for transportation of the capsule. In some embodiments, the capsule container is equipped with an identifier that can be scanned to associate the capsule with a specific transaction and to track its movement through the pneumatic tube system.

4 Claims, 6 Drawing Sheets

Unlocking capsule by gas station personnel — 502

Recording identifier of capsule — 504

Storing change, receipt and more and closing of capsule — 506

Propel cylindrical capsule towards gas pump — 508

Opening shield by customer — 510

Unlocking capsule by customer — 512

PNEUMATIC PAYMENT SYSTEM FOR GAS STATIONS AND METHOD OF USE

CROSS-REFERENCE TO RELATED APPLICATION

The present application claims priority to, and the benefit of, U.S. Provisional Application No. 63/404,708, which was filed on Sep. 8, 2022, and is incorporated herein by reference in its entirety.

FIELD OF THE INVENTION

The present invention relates generally to the field of payment systems. More specifically, the present invention relates to a novel pneumatic payment system for gas stations. The system uses a plurality of pneumatic tubes configured to carry cylindrical capsule containers for securely transporting payments, change, and receipts between a gas pump and an employee inside the gas station. The system improves convenience for customers and efficiency for gas stations by reducing wait times and providing a secure and streamlined payment process. Accordingly, the present disclosure makes specific reference thereto. Nonetheless, it is to be appreciated that aspects of the present invention are also equally applicable to other like applications, devices, and methods of manufacture.

BACKGROUND

By way of background, on roads and in cities, gas stations and convenience stores are a common sight. They provide a variety of services, from refueling automobiles to selling snacks and other goods. Unfortunately, these locations can frequently become busy with patrons, resulting in lengthy lineups, and waiting times for the patrons. Those in a rush or with children may find this especially troublesome and/or cumbersome because they lack the patience or time to wait in line, or the time to take children into the store.

Gas stations have been trying to address this problem of long waiting times at payment points by implementing self-service options, like pay-at-the-pump devices. However, these technologies do have some limitations. Pay-at-the-pump systems, for instance, do not take all kinds of payment, like cash. Further, many users of these devices feel uneasy, especially if they are not familiar with the technology.

The security of the transaction is another issue with the current gas station payment methods. With traditional payment options, the consumer must give the gas station attendant cash or a credit card, which can worry some customers who worry about theft or fraud. Currently, there is no tracking of physical transfer and further, cards or cash can be misplaced or handed to the wrong user. Further, traditional payment methods can sometimes be time-consuming, especially if there are lengthy queues, which can irritate and frustrate customers.

Therefore, there exists a long-felt need in the art for a payment system for gas stations that makes payment for gasoline and other items with cash at gas stations easy and convenient. There is also a long-felt need in the art for an improved payment system that enables individuals to make quicker payments for gas and items at the store without having to wait in long lines. Additionally, there is a long-felt need in the art for a gas station payment system that eliminates payment queues and improves transactions security. Moreover, there is a long-felt need in the art for a pneumatic payment system that provides a seamless experience for customers, reducing wait times, and providing an efficient means of payment. Finally, there is a long-felt need in the art for a pneumatic payment system that saves considerable time and effort when getting gas while traveling on a busy schedule and helps in improving revenue of gas stations.

The subject matter disclosed and claimed herein, in one embodiment thereof, comprises a pneumatic payment system for gas stations and convenience stores. The pneumatic payment system uses pneumatic tubes and enables individuals to make quicker payments for gas and other items. The pneumatic payment system further comprising a plurality of pneumatic tubes, each pneumatic tube extending from a gas pump to a service counter and can be of any length, each pneumatic tube is configured to propel and carry a durable and cylindrical capsule container, the container is designed for accommodating cash or credit card to be used by a customer at a gas pump for purchasing gas and/or convenience items and for returning change and receipts to the customer after a completed transaction, a plurality of blower units positioned in each pneumatic tube for propelling movement of the capsule container unidirectionally within the pneumatic tube from the gas pump to the service counter or in the opposite direction, and a central control unit for controlling and monitoring the system. The gas pump has a dispenser through which the capsule is inserted and retrieved by a customer of the gas station.

In this manner, the pneumatic payment system of the present invention accomplishes all of the forgoing objectives and provides users with a quick payment system for gas stations and convenience stores that features several pneumatic tubes connected to gas pumps. Customers can pay through any means at the gas pumps allowing them to make quicker payments for gas and other items from the convenience store without having to wait in long lines. The system using identification means to increase security of transactions while saving considerable time and effort.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pneumatic payment system for gas stations. The pneumatic payment system enables individuals to make quicker payments for gas and items at the store without having to wait in long lines. The pneumatic payment system further comprising a plurality of pneumatic tubes, each pneumatic tube extending from a gas pump to a service counter, each pneumatic tube configured to propel and carry a cylindrical capsule container, the container is designed for accommodating cash paid by a customer at the gas pump for purchasing gas and/or other convenience items and for returning change and receipt to the customer after a transaction, a plurality of blower units positioned in each pneumatic tube for propelling movement of the capsule container in one direction within the pneumatic tube from the gas pump to the service counter or in the opposite direction, and a central control unit for controlling and monitoring the system.

In yet another embodiment, each pneumatic tube has an individual controller, the individual controller is communicatively coupled to the central control unit and configured for controlling the dispensers of the gas pumps and the orientation of the blowers to maintain desired propelling and direction of the capsule container inside a pneumatic tube.

In yet another embodiment, the pneumatic payment system stores an entry containing a capsule identifier and an associated gas pump identifier for each cylindrical capsule, wherein each cylindrical capsule is associated with a specific gas pump, and allowing the central control unit to maintain flow of a capsule towards the associated gas pump.

In yet another embodiment, a method for facilitating payment for gasoline and other items at a gas station using a pneumatic payment system is described. The method comprising the steps of providing a plurality of pneumatic tubes, wherein each pneumatic tube extends from a separate gas pump to a payment or service counter of the gas station, providing a cylindrical capsule container for accommodating cash paid by a customer for purchasing gas and/or items, wherein the cylindrical capsule container is propelled and carried by each pneumatic tube in a unidirectional manner, providing a central control unit communicatively coupled to individual controllers of respective pneumatic tubes, wherein the central control unit monitors movement of different capsule containers travelling in different pneumatic tubes; opening and closing dispensers of the gas pumps using the individual controllers; and activating the orientation of the blowers for maintaining desired propelling and direction of the capsule container inside a pneumatic tube.

In yet another embodiment, the payment capsule includes a housing having an upper portion and a lower portion, an identifier on the housing for uniquely identifying the payment capsule, the identifier being in a machine-readable format, a locking mechanism on the housing for preventing unauthorized access to the contents of the payment capsule, the upper portion of the housing being transparent or translucent and the lower portion being opaque, with the upper portion and the lower portion being pivotally coupled along a common edge for easy access to the accommodated items.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

4

Figure 3:
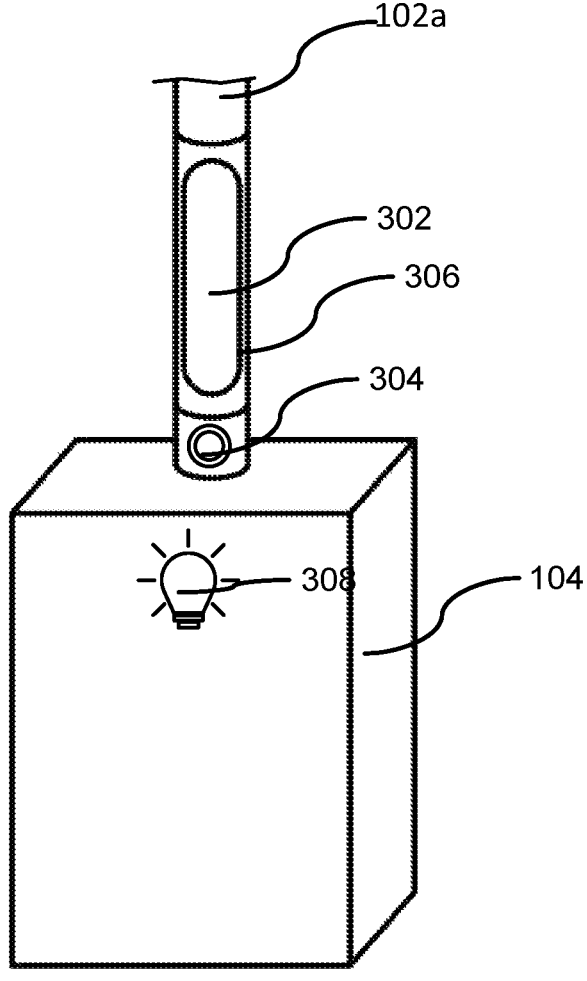
Figure 4:
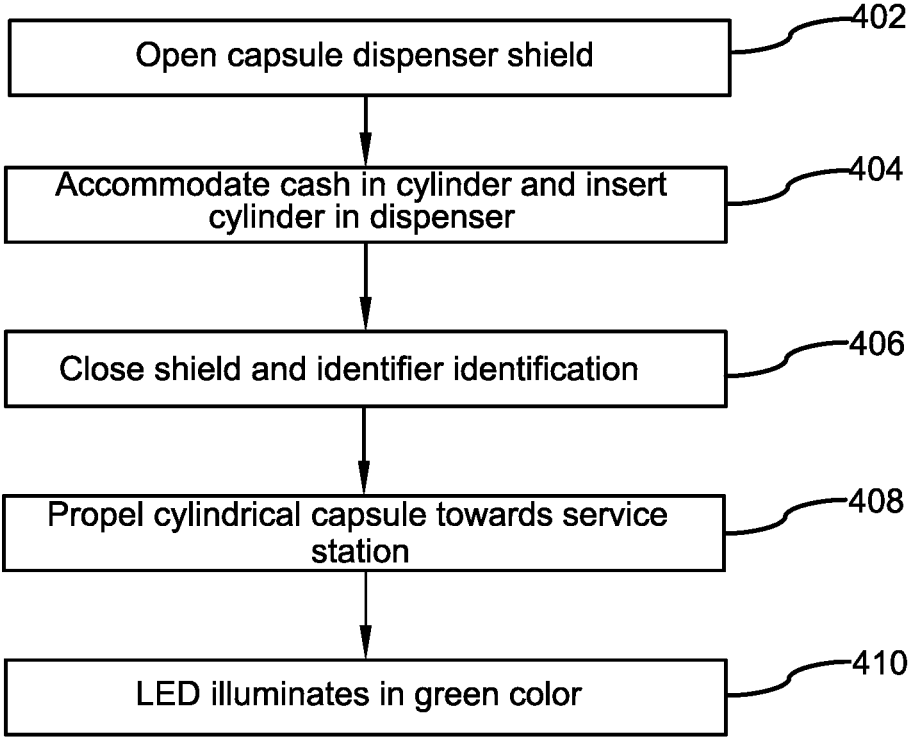
Figure 5:
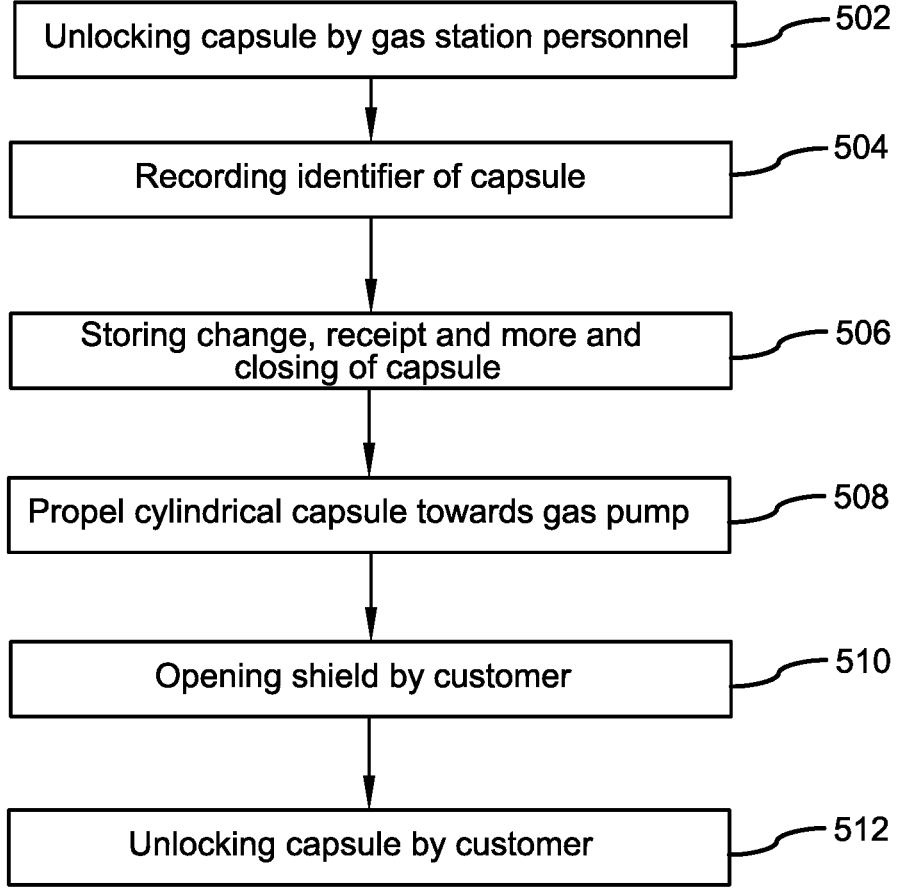
Figure 6:
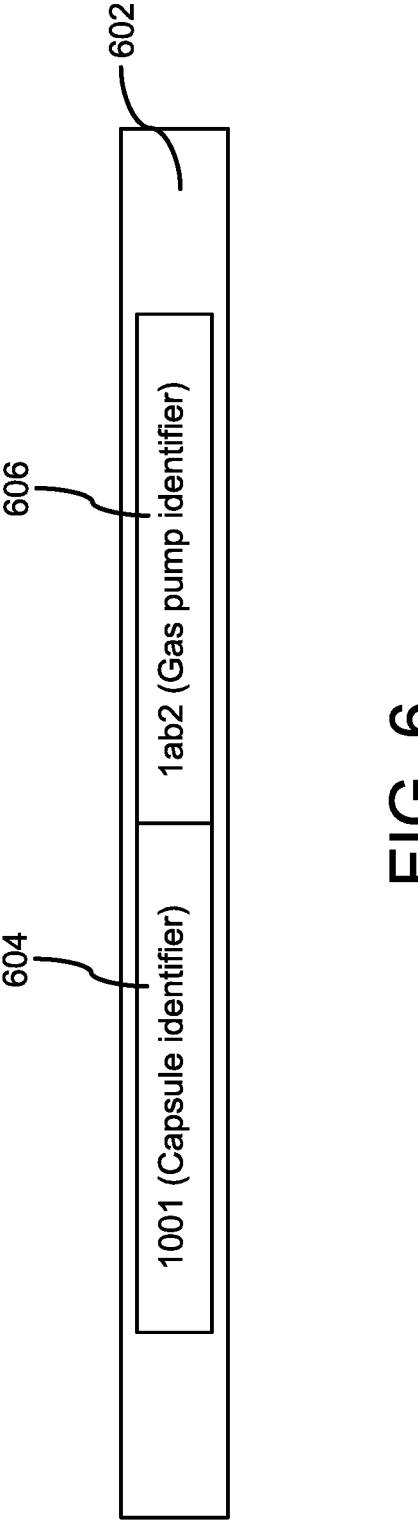

FIG. 3 illustrates an enlarged view of a gas pump used in the pneumatic system of the present invention showing cylindrical capsule container dispenser in accordance with the disclosed architecture;

FIG. 4 illustrates a flow diagram describing functionality of the pneumatic system for sending cash or credit card to an employee in accordance with the disclosed architecture;

FIG. 5 illustrates a flow diagram describing operation of the pneumatic system for providing receipt and other items to a customer in accordance with the disclosed architecture; and FIG. 6 illustrates a process of maintaining correspondence of a cylindrical capsule and a gas pump dispenser of the pneumatic system of the present invention in accordance with the disclosed architecture.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a payment system for gas stations that enables payment for gasoline and other items with cash at gas stations easy and convenient. There is also a long-felt need in the art for an improved payment system that enables individuals to make quicker payments for gas and other convenience items at the store without having to wait in long lines and without having to go inside the convenience store. Additionally, there is a long-felt need in the art for a gas station payment system that eliminates payment queues and improves transaction security. Moreover, there is a long-felt need in the art for a pneumatic payment system that provides a seamless experience for customers, reducing wait times and providing an efficient means of payment. Finally, there is a long-felt need in the art for a pneumatic payment system that saves considerable time and effort when getting gas while traveling on a busy schedule and helps in improving revenue of gas stations.

The present invention, in one exemplary embodiment, is a method for using a pneumatic tube system for a gas station payment process. The method includes opening a capsule dispenser shield of a pneumatic tube when a customer approaches a gas pump, inserting a cylindrical capsule, in a closed state, containing cash or any other payment means inside the dispenser, closing the shield and identifying the identifier of the capsule by the individual controller of the pneumatic tube, and propelling the cylindrical capsule towards the service or payment station through the pneumatic tube using blowers that create a pressure difference in the pneumatic tube for allowing the capsule to travel seamlessly and quickly through the tube.

Figure 1:
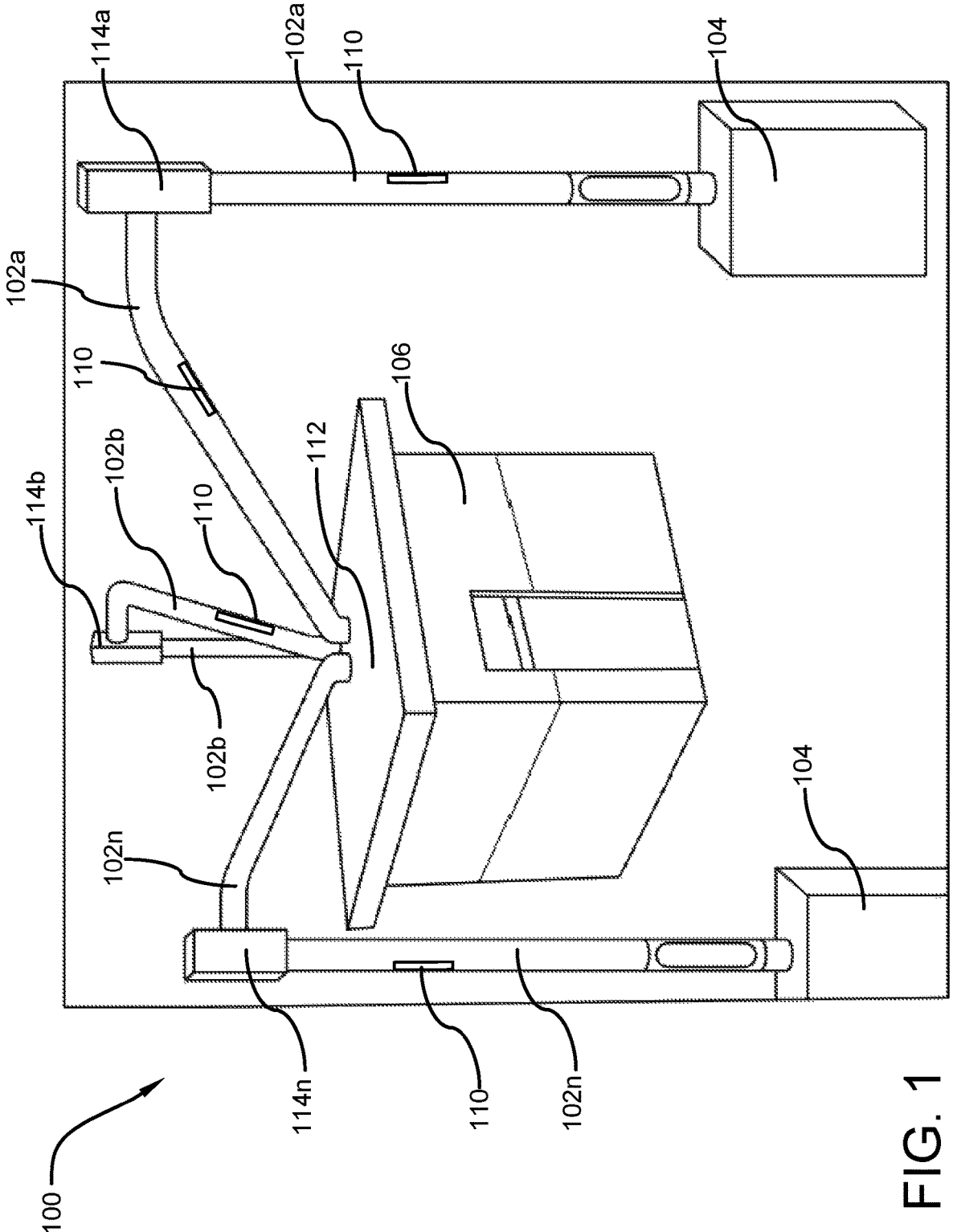
FIG. 1 illustrates a mechanical diagram of an items ordering and payment pneumatic system of the present invention in accordance with the disclosed architecture.
Figure 2:
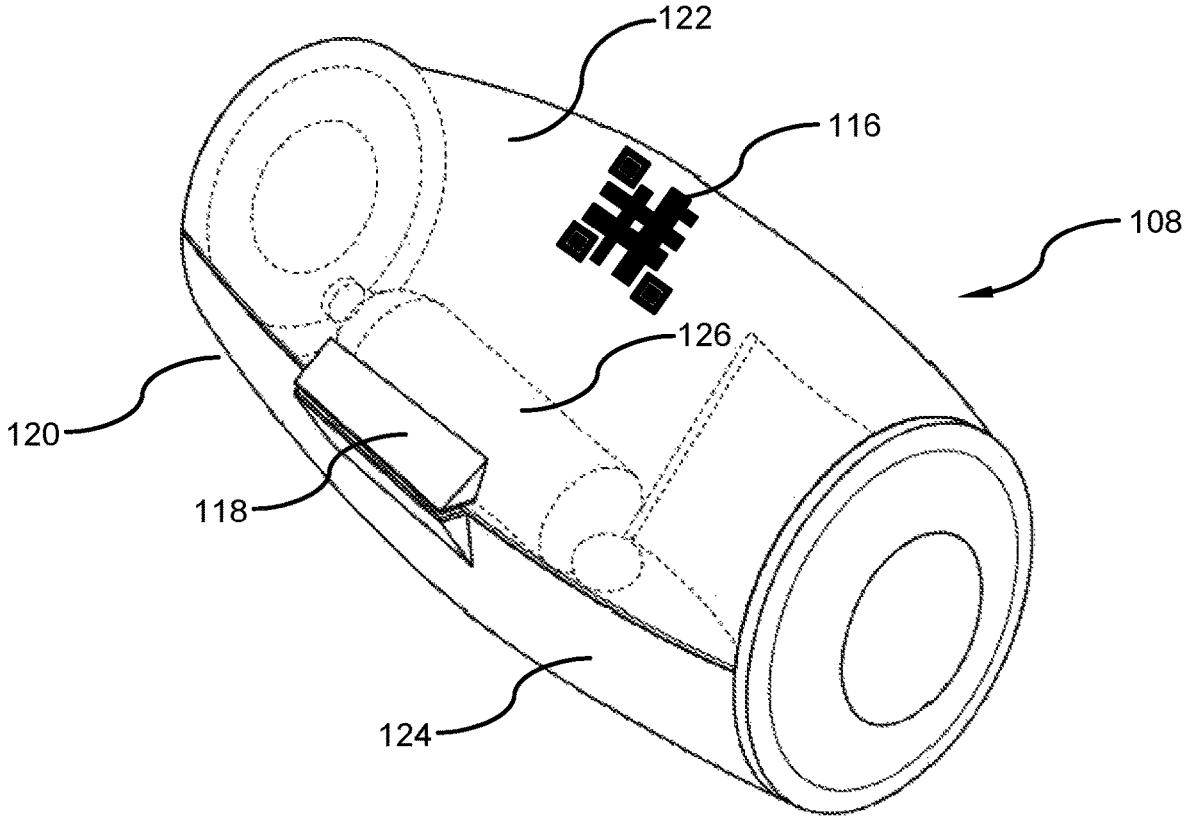
FIG. 2 illustrates a perspective view of one potential embodiment of the cylindrical capsule container used in the pneumatic system of the present invention in accordance with the disclosed architecture.

Referring initially to the drawings, FIG. 1 illustrates a mechanical diagram of an items ordering and payment pneumatic system of the present invention in accordance with the disclosed architecture. The pneumatic payment system 100 of the present invention is designed to make payment for gasoline and other items with cash at gas stations easy and convenient. More specifically, the system 100 includes a plurality of pneumatic tubes 102a-n wherein each pneumatic tube extends from a gas pump 104 (separate gas pumps corresponding to tubes 102a-n; referred generally to 104 in the disclosure) to an automatic or manual payment or service counter 106 of the gas station. Each pneumatic tube is configured to propel and carry a cylindrical capsule container 108 as illustrated in FIG. 2, the cylindrical capsule container 108 is used for accommodating cash paid by a customer for purchasing gas and/or items. The cylindrical capsule container 108 is also used for returning the change and receipt to the customer after completion of a transaction. It should be noted that as illustrated, a separate and independent pneumatic tube connects an individual gas pump and the service counter 106. The service counter 106 can be more than one as well in some embodiments as per design of the pneumatic system 100 and number of gas pumps 104.

For propelling movement of the capsule container 108 inside a pneumatic tube, a plurality of blower units 110 are positioned in each of the pneumatic tubes 102a-n. All the blower units can be identical and thus referred commonly as 110. The blower units 110 function as compressed air pumps to propel the capsule container 108 unidirectionally in a direction either from the gas pump 104 to the service counter 106, or in an opposite direction from the service counter 106 to the gas pump 104. A central control unit 112 is configured to control the system 100 and monitors movement of different capsule cylinders travelling in different pneumatic tubes 102a-n. The central control unit 112 preferably maintains a first in first out (FIFO) movement of the capsule cylinders or containers in individual pneumatic tubes.

The central control unit 112 is communicatively coupled to individual controllers 114a-n of respective pneumatic tubes 102a-n. The individual controllers 114a-n are used for opening and closing dispensers of the gas pumps 102 as illustrated in FIG. 3. The individual controllers 114a-n also monitor and activate the orientation of the blowers 110 for maintaining desired propelling and direction of the capsule container 108 inside a pneumatic tube. The system 100 enables users to pay for gas and other items through cash at their gas pump without requiring them to stand in a queue. Further, the system 100 can be used for paying through various forms of payment, including. but not limited to. cash, coins, and credit/debit cards.

The pneumatic tube system 100 transports payment capsules quickly and efficiently, ensuring a seamless payment process for customers and gas station employees alike. The pneumatic system 100, although described to be implemented in a gas station, can be implemented in different businesses, by way for example, including hospitals, shopping marts, general stores, and more.

FIG. 2 illustrates a perspective view of one potential embodiment of the cylindrical capsule container used in the pneumatic system of the present invention in accordance with the disclosed architecture. The capsule container 108 is a key component of the specialized payment system 100. The capsule 108 is designed to securely transport payments, change, and receipts between a gas pump and the employee inside the gas station. For uniquely identifying a capsule container, the capsule is equipped with an identifier 116. The identifier 116 can be in the form of a barcode, QR code, an integrated chip, or other machine-readable format that can be scanned by a gas station employee to associate the capsule 108 with a specific transaction. The identifier 116 can also be used to track the movement of the capsule 108 through the pneumatic tube system 100 and further can be used for troubleshooting identification.

For preventing unauthorized access to the payment capsule 108, the capsule 108 is equipped with a locking mechanism 118. The locking mechanism 118 can be a combination lock, key lock, or electronic lock that is controlled by a gas station employee. The locking mechanism 118 ensures that payments, change, and receipts are securely transported between the gas pump and the employee inside the gas station. The capsule 108 has a housing 120 for providing space to accommodate payments, change, receipts, and any other items therein. The housing 120 is made from a sturdy material such as metal or high-grade plastic and is designed to resist damage from impact or vibration. The capsule 108 is also designed to be waterproof and dustproof to protect its contents from environmental factors.

In some embodiments of the present invention, the payment capsule 108 is available in different sizes to accommodate various payment amounts. For example, a larger payment capsule can be used to transport larger bills or multiple bills, while a smaller payment capsule can be used for smaller bills or coins. The capsule sizes are standardized to ensure compatibility with the payment capsule dispenser at the gas pumps.

In one exemplary embodiment, the upper portion 122 of the housing is transparent or translucent and the lower portion 124 is opaque. The lock mechanism 118 is configured to lock the upper portion 122 and the lower portion 124 securely. Further, the upper portion 122 and the lower portion 124 are pivotally coupled to each other along a common edge for easy access of the accommodated items 126.

FIG. 3 illustrates an enlarged view of a gas pump used in the pneumatic system of the present invention showing cylindrical capsule container dispenser in accordance with the disclosed architecture. As illustrated, the gas pump 104 has a dispenser 302 for allowing a customer to insert a capsule 108 into a pneumatic tube 102a. The dispenser 302 is operated either automatically or manually using an operating button 304 wherein a shield 306 of the dispenser 302 is opened or closed. The dispenser 302 is dimensioned to receive a capsule 108 easily allowing a user to insert and retrieve the capsule 108 easily.

Once the shield 306 is closed, the pneumatic tube 102a is activated and propels the payment capsule 108 through the tube to the gas station employee inside the gas station. The dispenser 302 can be adjusted to accommodate different sizes of payment capsules, ensuring that customers can make payments quickly and easily using the specialized payment system. A LED indicator 308 configured to blink in either Red or Green is configured to illuminate with Red color showing that a capsule is in transit and Green color indicating that the capsule 108 has reached the service counter 106.

FIG. 4 illustrates a flow diagram describing functionality of the pneumatic system for sending cash or credit card to an employee in accordance with the disclosed architecture. Initially, capsule dispenser shield of a pneumatic tube is opened when a customer is ready to make a payment and approaches a gas pump (Step 402). The shield can open automatically or can be manually opened by the customer. Then, a cylindrical capsule is used by the customer to accommodate cash or any other payment means in the cylindrical capsule and the capsule in a closed state is inserted inside the dispenser (Step 404).

Thereafter, the shield is closed and the individual controller of the pneumatic tube identifies the identifier of the capsule and transmits to the central controller for tracking (Step 406). Thereafter, the blowers associated with the pneumatic tube propels the cylindrical capsule towards the service or payment station (Step 408). The blowers are automatically activated by the individual controller of the pneumatic tube in which the capsule is inserted. Blowers are configured to create a pressure difference in the pneumatic tube for allowing the capsule to travel along the tube seamlessly and quickly. Thereafter, once the capsule reaches the service center, the LED illuminates in green color (Step 410).

FIG. 5 illustrates a flow diagram describing operation of the pneumatic system for providing receipt and other items to a customer in accordance with the disclosed architecture. The flow of steps described in FIG. 5 is in continuation of FIG. 4 and takes place once the capsule reaches the service center of the gas station. A gas center employee, upon receiving the capsule, unlocks the capsule and retrieves the cash, card, and more stored in the capsule (Step 502). Then, the employee processes the payment for the customer and records the identifier of the capsule (Step 504). In some embodiments, the identifier is automatically displayed on a user interface to the employee.

Thereafter, the change, receipt and any other ordered items are stored in the capsule and the capsule is closed by the employee (Step 506). The capsule is inserted into a dispenser positioned at the service center and the blowers of the pneumatic tube are automatically activated (Step 508). Then, the capsule automatically travels to the dispenser positioned at the gas pump wherein the customer opens the shield to retrieve the capsule (Step 510). Finally, the capsule is unlocked by the customer and the receipt and change is retrieved (Step 512), thus, making the process smooth, seamless, and automatic.

FIG. 6 illustrates a process of maintaining correspondence of a cylindrical capsule and a gas pump dispenser of the pneumatic system of the present invention in accordance with the disclosed architecture. The pneumatic system 100 operates by allowing the entry and exit of a payment capsule 108 from the dispenser of a single gas pump such as dispenser 302 of the tube 102a. This prevents the possibility of fraudulent transactions or theft by ensuring that each payment capsule is associated with a specific gas pump. The pneumatic system 100 associates each payment capsule with a specific gas pump. This association is maintained using a capsule identifier 604 and an associated gas pump identifier 606, both of which are stored in an entry 602 in the pneumatic system 100. The entry 602 can be stored in any type of database such as a relational database (not shown).

When a customer inserts a payment capsule 108 into the dispenser 302 of a gas pump 104, the capsule identifier 604 and the gas pump identifier 606 are read from the entry 602. The central controller 112 uses the information in the entry 602 to maintain the flow of the payment capsule 108 towards the associated gas pump 104. This also ensures that the payment capsule 108 is delivered to the gas station employee inside the gas station who is responsible for processing the payment. Both the capsule identifier 604 and the gas pump identifier 606 can be alphanumeric, special letter, or anything else for unique identification and can be preconfigured or randomly generated.

The pneumatic tubes 102a-n can be made of any durable material, including, but not limited to, aluminum, plastic, fiber, PVC, and the like. Any variety of materials, depending on factors such as cost, durability, and ease of installation can be used for tubers 102a-n. In addition, the pneumatic tubes can have any number of bends and can have any length. This means that the pneumatic tubes can be customized to fit the specific needs of the gas station where the system 100 is installed. For example, if the gas station has limited space, the pneumatic tubes can be designed with fewer bends to minimize the space required for installation. Furthermore, the pneumatic tubes 102a-n can be installed both above and below the ground. This enables for flexibility in the installation process, as the tubes can be installed in a variety of locations depending on the specific needs of the gas station.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "items ordering and payment pneumatic system", "pneumatic system", "pneumatic payment system", and "system" are interchangeable and refer to the pneumatic system for processing payments 100 of the present invention.

Notwithstanding the forgoing, the pneumatic system for processing payments 100 of the present invention can be of any suitable size and configuration as is known in the art without affecting the overall concept of the invention, provided that it accomplishes the above-stated objectives. One of ordinary skill in the art will appreciate that the pneumatic system for processing payments 100 as shown in the FIGS. are for illustrative purposes only, and that many other sizes, configurations and shapes of the pneumatic system for processing payments 100 are well within the scope of the present disclosure. Although the dimensions of the pneumatic system for processing payments 100 are important design parameters for user convenience, the pneumatic system for processing payments 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for processing payments at a gas pump, the system comprising:

a plurality of pneumatic tubes extending from a plurality of gas pumps to a service counter inside a service station, each pneumatic tube comprising a dispenser and a controller;

a plurality of cylindrical capsules each comprising a housing comprising an upper portion pivotally connected to a lower portion, a capsule identifier, and a locking mechanism;

wherein said plurality of pneumatic tubes are configured to propel the plurality of cylindrical capsules from said gas pump to said service counter, and alternatively from said service counter to said gas pump;

a blower unit positioned in each of said plurality of pneumatic tubes for propelling the plurality of cylindrical capsules;

wherein each blower unit comprises a compressed air pump;

a central control unit communicatively coupled to the controllers on each of the plurality of pneumatic tubes and configured to open the dispensers for insertion of one of the plurality of cylindrical capsules; and a plurality of LED indicators at each gas pump each configured to indicate that the cylindrical capsule is in transit with a first color and to indicate the cylindrical capsule has reached the service counter with a second color;

wherein the central control unit maintains a first in first out (FIFO) movement of the plurality of cylindrical capsules in the plurality of pneumatic tubes; and wherein each controller is configured to monitor and activate an orientation of each blower unit for the propelling of each cylindrical capsule selectively in a first direction and a second direction.

2. A method of processing payments at a gas pump, the method comprising the steps of:

providing a system to process payments at a gas pump, the system comprising:

a plurality of pneumatic tubes extending from a plurality of gas pumps to a service counter inside a service station, each pneumatic tube comprising a dispenser and a controller;

a plurality of cylindrical capsules each comprising a housing comprising an upper portion pivotally connected to a lower portion, a capsule integrated chip identifier, and an electronic lock;

a blower unit comprises a compressed air pump positioned in each pneumatic tubes for propelling the plurality of cylindrical capsules;

a central control unit communicatively coupled to the controllers on each of the plurality of pneumatic tubes and configured to open the dispensers for insertion of one of the plurality of cylindrical capsules; and a plurality of LED indicators at each gas pump; and opening a selectable closure of one of the cylindrical capsules and securing contents inside said, wherein said contents are a payment for a purchase of fuel at said gas pump, and further wherein said payment is a manual payment;

propelling said cylindrical capsule in a first direction through said plurality of pneumatic tubes from said gas pump to said service counter with said manual payment, wherein said manual payment is sent from said gas pump to said service counter; and propelling said cylindrical capsule in a second direction through said plurality of pneumatic tubes from said service counter to said gas pump with change and a receipt;

illuminating the LED indicator at the respective gas pump with a first color to indicate one of the cylindrical capsules is in transit and with a second color to indicate the cylindrical capsule has reached the service counter;

wherein the central control unit maintains a first in first out (FIFO) movement of the plurality of cylindrical capsules in the plurality of pneumatic tubes; and wherein each controller is configured to monitor and activate an orientation of each blower unit for the propelling of each cylindrical capsule selectively in a first direction and a second direction.

3. The method of processing payments at a gas pump of claim 2, wherein said manual payment is a cash payment.

4. The method of processing payments at a gas pump of claim 2, wherein said manual payment is a credit card payment.

* * * * *